United States Patent
Ou et al.

(10) Patent No.: US 8,229,725 B1
(45) Date of Patent: Jul. 24, 2012

(54) METHOD AND APPARATUS FOR MODELING PROCESSOR-BASED CIRCUIT MODELS

(75) Inventors: Jingzhao Ou, Sunnyvale, CA (US); Chi Bun Chan, San Jose, CA (US); Shay Ping Seng, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 570 days.

(21) Appl. No.: 12/240,874

(22) Filed: Sep. 29, 2008

(51) Int. Cl.
*G06F 17/50* (2006.01)
*G06F 9/455* (2006.01)

(52) U.S. Cl. .......................... 703/15; 703/25

(58) Field of Classification Search .............. 703/15, 703/25
See application file for complete search history.

(56) References Cited

U.S. PATENT DOCUMENTS

| | | | |
|---|---|---|---|
| 6,634,017 B2 * | 10/2003 | Matsui et al. ............... | 716/102 |
| 6,934,674 B1 | 8/2005 | Douezy et al. | |
| 6,947,882 B1 | 9/2005 | Reblewski et al. | |
| 7,098,688 B2 | 8/2006 | Reblewski et al. | |
| 7,110,935 B1 | 9/2006 | Hwang et al. | |
| 2004/0139262 A1 * | 7/2004 | Beaudoin et al. ............ | 710/305 |

OTHER PUBLICATIONS

Xilinx, "Xilinx System Generator for DSP Version 9.1.01", User Guide, Pag, 24-28, 39, 139-143, 167-182, 190-196, 227-237, 362-374, 664, 683-693, Mar. 2007.*
AVNET, "2007 Xfest, Xilinx FPGA Co-Processors for TI DSPs", Jun. 2007.*
Xilinx, "Interfacing Xilinx FPGAs to TI DSP Platforms Using the EMIF", Application Note, Jan. 2007.*
Texas Instruments, "Xilinx FPGA Peripherals for Texas Instruments DSPs using VLYNQ", May 2008.*
Texas Instruments, "TMS320DM643x DMP VLYNQ Port", user's Guide, SPRU938B, Sep. 2007.*
Xilinx, "Xilinx System Generator for DSP Version 9.1.01", User Guide, Mar. 2007.*
U.S. Appl. No. 11/633,977, filed Dec. 5, 2006, Seng, S.P., et al., Xilinx, Inc. 2100 Logic Drive, San Jose, CA 95124.
Xilinx Inc., "System Generator for DSP User Guide" , DSP48A, version 10.1.1, published Apr. 29, 2008 accessible at http://www.xilinx.com/support/documentation/dt_sysgendsp_sysgen10-1.htm, pp. 137-223, Xilinx, Inc. 2100 Logic Drive, San Jose, CA 95124.
Xilinx Inc., "System Generator for DSP User Guide" , System-Level Modeling in System Generator , version 9.2.01, published Oct. 2007 accessible at http://www.xilinx.com/support/documentation/sw_manuals/sysgen_bklist.pdf, pp. 19-60, Xilinx, Inc. 2100 Logic Drive, San Jose, CA 95124.
Xilinx Inc., "System Generator for DSP User Guide", Designing with Embedded Processors and Microcontrollers, version 9.2.01, published Oct. 2007 accessible at http://www.xilinx.com/support/documentation/sw_manuals/sysgen_bklist.pdf, pp. 141-219, Xilinx, Inc. 2100 Logic Drive, San Jose, CA 95124.

* cited by examiner

*Primary Examiner* — Hugh Jones
*Assistant Examiner* — Angel Calle
(74) *Attorney, Agent, or Firm* — Robert M. Brush; LeRoy D. Maunu; Thomas George

(57) ABSTRACT

Method and apparatus for modeling processor-based circuit models are described. Some examples relate to designing a circuit model having a processor system and custom logic. A bus adapter coupled to a bus of the processor system is generated. A shared memory interface between the custom logic and the bus adapter is generated. The shared memory interface includes a memory map for the processor system. A clock wrapper having a first clock input and a second clock input is generated. The first clock input drives the custom logic and first shared memory of the shared memory interface. The second clock input drives the processor system.

16 Claims, 5 Drawing Sheets

METHOD AND APPARATUS FOR MODELING PROCESSOR-BASED CIRCUIT MODELS

FIELD OF THE INVENTION

One or more aspects of the present invention relate generally to electronic design automation and, more particularly, to a method and apparatus for modeling processor-based circuit models.

BACKGROUND OF THE INVENTION

Electronic design automation (EDA) systems provide software tools in which electronic circuit designs can be described, simulated, and translated by machine into a design realization. A conventional mechanism for describing a circuit design is hardware description language (HDL). A user defines a behavioral description of a design using HDL and the HDL design is processed to generate a physical implementation. HDL design tools include HDL simulation environments, such as the MODELSIM environment from the Model Technology Company, and implementation environments, such as SYNPLIFY from Synplicity, Inc. Another type of circuit design system, referred to as a high level modeling system (HLMS), provides a higher level of abstraction for describing and simulating an electronic circuit than does an HDL simulation environment or implementation environment. An HLMS generally provides a mathematical representation of signals as compared to standard logic vectors in HDL. The Xilinx SYSTEM GENERATOR TOOL FOR DSP from Xilinx, Inc. and the SIMULINK and MATLAB environments from MathWorks, Inc. are exemplary high level modeling systems.

A design implemented in an HLMS can be simulated using software algorithms that model the hardware behavior of the blocks that comprise the model. Sometimes it is beneficial to use hardware, in addition to software, during a simulation. Using hardware in the simulation loop can accelerate simulation speeds dramatically, while also providing real-time hardware verification capabilities. The process of breaking a design into pieces and simulating those pieces using subsidiary design tools is referred to as "co-simulation." When the subsidiary tool of interest is a reconfigurable hardware platform, the process is referred to as "hardware co-simulation." In hardware co-simulation, the simulation of a portion of a design under test (DUT) is offloaded to hardware, while the other portion of the DUT continues to be simulated on the host PC through software models. The DUT can include the hardware being modeled ("hardware model"), and hardware co-simulation logic for providing a co-simulation interface to the hardware model. The host simulation environment (software) passes stimuli to the input ports of the DUT running on hardware via a communication interface. Similarly, the communication interface captures results from the output ports of the DUT and then read back to the host simulation environment.

Conventionally, an HLMS has often been used to design and simulate systems that are easily expressed as data flow diagrams (e.g., digital filters). As HLMS's mature, designers are seeking to incorporate larger systems into an HLMS, such as video-processing engines (e.g., MPEG encoders and decoders) and system-on-chip (SoC) designs, for example. Such designs may include instances of embedded instruction processors that communicate with custom logic peripherals.

A processor-based system designed in an HLMS can be modeled in hardware and simulated using hardware co-simulation. When the processor-based system is configured as a DUT, the hardware co-simulation logic can drive the processor-based system with a single clock. However, the single clock wiring scheme has some limitations in practical designs. Notably, the instruction processor may expect a specific input clock frequency that is not available from the hardware co-simulation logic. For example, the hardware co-simulation logic may be capable of providing specific frequencies (e.g., 33.33 MHz, 50 MHz, 66.67 MHz, and 100 MHz). However, the instruction processor (and other associated logic) may require an input clock frequency of 125 MHz, which cannot be provided by the hardware co-simulation logic. In other cases, the processor-based system is required to run with a clock frequency different from that of the custom logic developed using the HMLS. These different clock frequency requirements cannot be provided through single clock wiring. Moreover, in some DUTs, both the instruction processor and the hardware co-simulation logic may include digital clock management (DCM) components. In such case, single clock wiring results in cascaded DCM components, which may introduce undesired clock jitters and prevent the design portion simulated in the hardware to meet specific timing requirements.

Accordingly, there exists a need in the art for a method and apparatus for modeling processor-based circuit models that overcome the aforementioned deficiencies associated with single clock wiring.

SUMMARY OF THE INVENTION

Method and apparatus for modeling processor-based circuit models are described. An aspect of the invention relates to a computer implemented method of designing a circuit model having a processor system and custom logic. In some embodiments, the method includes generating a bus adapter coupled to a bus of the processor system; generating a shared memory interface between the custom logic and the bus adapter, the shared memory interface including a memory map for the processor system; and generating a clock wrapper having a first clock input and a second clock input, the first clock input driving the custom logic and first shared memory of the shared memory interface, the second clock input driving the processor system Another aspect of the invention relates to a method of simulating a circuit model having a processor system and custom logic. In some embodiments, the method includes: configuring the circuit model in at least one programmable device, the circuit model including a clock wrapper having a first clock input and a second clock input, the first clock input configured to drive the custom logic and the second clock input configured to drive the processor system; executing software in a computer coupled to the at least one programmable device to control simulation of the circuit model; and coupling a first clock signal to the first clock input and a second clock signal to the second clock input during the simulation.

Another aspect of the invention relates to an apparatus for simulating a circuit model having a processor system and custom logic. In some embodiments, the apparatus includes: at least one programmable device having the circuit model configured therein, the circuit model including a clock wrapper having a first clock input and a second clock input, the first clock input configured to receive a first clock signal to drive the custom logic and the second clock input configured to receive a second clock signal to drive the processor system; and a computer, coupled to the at least one programmable device, configured to execute software to simulate logic and control simulation of the circuit model in the at least one programmable device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
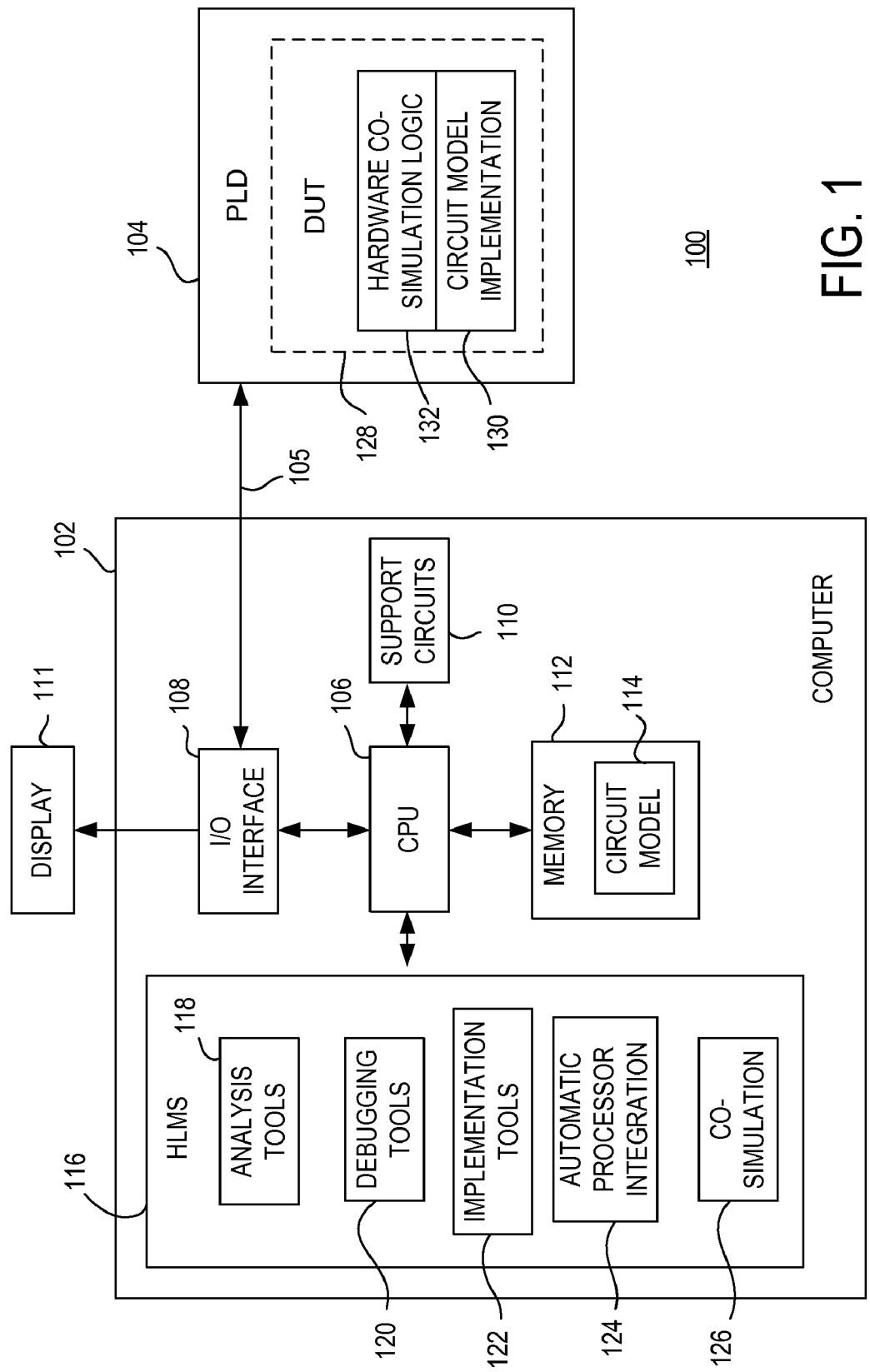
FIG. 1 is a block diagram depicting an electronic design automation (EDA) system according to some embodiments of the invention.

FIG. 1 is a block diagram depicting an electronic design automation (EDA) system 100 according to some embodiments of the invention. The system 100 includes a computer 102 coupled to a programmable logic device (PLD) 104 via a communication interface 105. The computer 102 includes a central processing unit (CPU) 106, a memory 112, a variety of support circuits 110, and an I/O interface 108. The CPU 106 may be any type of microprocessor known in the art. The support circuits 110 for the CPU 106 include conventional cache, power supplies, clock circuits, data registers, I/O interfaces, and the like. The I/O interface 108 may be directly coupled to the memory 112 or coupled through the CPU 106, and may be coupled to a conventional keyboard, network, mouse, printer, and interface circuitry adapted to receive, transmit, and display data (not shown). The I/O interface 108 may be coupled to a display 111. The memory 112 may include one or more of random access memory, read only memory, magneto-resistive read/write memory, optical read/write memory, cache memory, magnetic read/write memory, and the like, as well as signal-bearing media as described below.

The computer 102 is further configured with a high level modeling system (HLMS) 116. In general, the HLMS 116 is used to electronically design and model a circuit. The HLMS 116 describes the circuit in response to schematic or logic level input by a circuit designer to produce a circuit model 114. The circuit model 114 is shown as being stored as data in the memory 112. The circuit model 114 can be schematically represented on a graphical user interface (GUI). In some embodiments, the circuit model 114 is an abstraction of a circuit that includes "blocks", "ports", and "nets". Blocks, or logic blocks, represent sections, having circuit elements, of the circuit model 114. Ports represent inputs and outputs of blocks, and nets, or networks, represent connections between various ports of various blocks. The blocks, ports, and nets of the circuit model 114 represent an abstraction of a circuit in a well-known manner.

For example, blocks, ports, and nets are abstractions that may be produced by SYSTEM GENERATOR FOR DSP, commercially available from Xilinx, Inc, or other known abstraction translators. As understood by those skilled in the art, however, EDA systems may employ other types of abstractions to represent a circuit in addition to, or in place of, the above-described blocks, ports, and nets. In general, the circuit model 114 produced by the HLMS 116 includes a plurality of descriptions that represent the structure and/or behavior of circuit elements.

The HLMS 116 includes one or more analysis tools 118, one or more debugging tools 120, implementation tools 122, an automatic processor integration module 124, and a co-simulation module 126. The co-simulation module 126 is configured to execute and control hardware co-simulation of the circuit model 114 using the PLD 104. In particular, the implementation tools 122 comprise various tools for physically implementing the circuit model 114. The implementation tools 122 produce a configuration bitstream that is loaded into the PLD 104, such as a field programmable gate array (FPGA). An FPGA is a well-known integrated circuit (IC) capable of implementing user-defined circuits using programmable logic. Implementation tools for an FPGA may include a synthesis tool for producing a logical or gate-level netlist, a map tool for mapping the netlist onto FPGA resources, a place-and-route (PAR) tool for placing the mapped resources and routing connections between them, and a bitstream generator for generating a configuration bitstream. Such FPGA implementation tools are well known in the art. Note that although the present description uses an example of a PLD or an FPGA for implementing portions of the system, in other embodiments other programmable devices, including partially programmable devices, or hardware devices may be used. Also, in some embodiments, more than one device may be used in the system. For example, a separate processor device may be coupled to a programmable device, or a processor device may include a portion of programmable fabric. As another example, one or more peripheral devices may be coupled to the system.

The configuration bitstream produce by the implementation tools 122 is loaded into the PLD 104 to establish a design under test (DUT) 128. The DUT 128 includes an implementation of the circuit model 114 ("circuit model implementation 130") and hardware co-simulation logic 132. When the circuit model 114 is configured for hardware co-simulation, the HLMS 116 automatically adds a description of the hardware co-simulation logic 132 to the circuit model 114. The hardware co-simulation logic 132 generally provides a communication interface between the circuit model implementation 114 and the co-simulation module 126 executing in the computer 102. In particular, as discussed in more detail below, the hardware co-simulation logic 132 provides clocking for at least a portion of the circuit model implementation 130. The process of adding a description of the hardware co-simulation logic 132 to the circuit model 114 can be transparent to the designer. Together, the co-simulation module 126 and the hardware co-simulation logic 132 comprise a hardware co-simulation system.

The co-simulation module 126 is configured to drive the PLD 104 for simulation of the DUT 128. The co-simulation module 108 can pass stimuli to the input ports of the DUT 128 running on the PLD 104. Similarly, the co-simulation module 126 can capture results from the output ports of the DUT 128. Further, the co-simulation module 126 interfaces with the hardware co-simulation logic 132 to control clocking of at least a portion of the circuit model implementation 130. In particular, the co-simulation module 126 can configure the hardware co-simulation logic 132 to provide a free-running clock, or a gated clock for single step control by the co-simulation module 126.

In some embodiments, the HLMS 116 may be implemented as software configured to execution by the CPU 106. Although exemplary embodiments of the HLMS 116 are disclosed as being implemented as a computer executing a software program, those skilled in the art will appreciate that the HLMS 116 may be implemented in hardware, software, or a combination of hardware and software. Such implementations may include a number of processors independently executing various programs and dedicated hardware, such as application specific integrated circuits (ASICs) and the like.

In some embodiments, the circuit model 114 includes a processor system interfacing with custom logic. For example, a designer may specify the custom logic using the facilities of the HLMS 116, and may import the processor system as a block configured for communication with the custom logic. The custom logic may comprise a myriad of possible circuits. The processor system may have been designed using other tools (not shown), such as embedded design tools. The automatic processor integration module 124 is configured to automatically generate the communication interface between the processor system and the custom logic. The automatic processor integration module 124 also generates a clock wrapper for the circuit model 114 that accepts two clock sources. The processor system is driven by one of the clock sources, and the custom logic is driven by the other of the clock sources. Such a clocking scheme is referred to herein as a "dual-clock scheme", as opposed to a "single-clock scheme", where the circuit model is driven by a single clock. Note that in other embodiments, a system may have more than two clocks.

Figure 2:
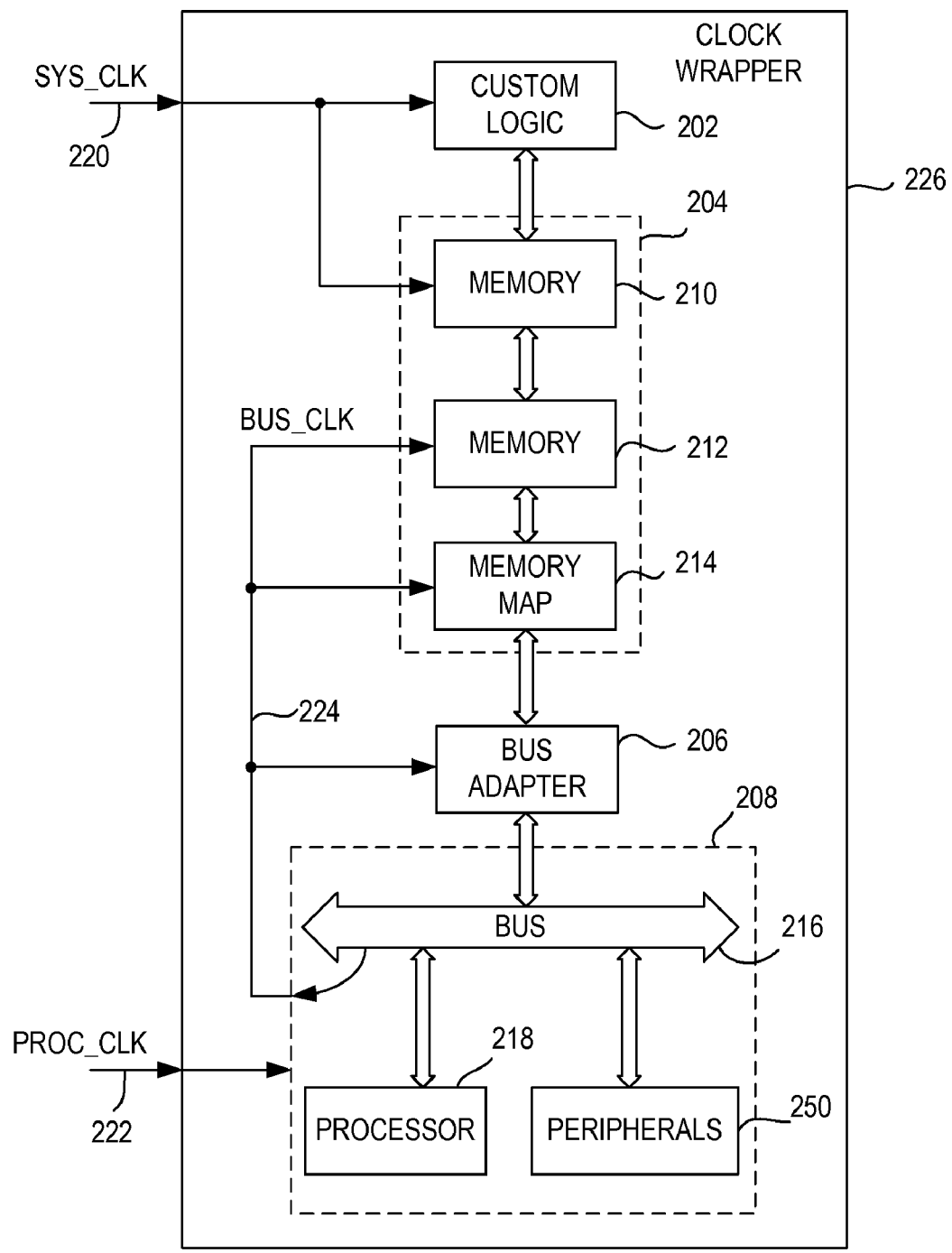
FIG. 2 is a block diagram depicting the circuit model according to some embodiments of the invention.

FIG. 2 is a block diagram depicting the circuit model 114 according to some embodiments of the invention. The circuit model 114 includes custom logic 202, a shared memory interface 204, a bus adapter 206, a processor system 208, and a clock wrapper 226. The shared memory interface 204 and the bus adapter 206 comprise a communication interface between the processor system 208 and the custom logic 202. The custom logic 202 and the processor system 208 may operate asynchronously with respect to each other (i.e., the processor system 208 may be clocked asynchronously with respect to the custom logic 202). The shared memory interface 204 is used to facilitate communication between the two potentially different clock domains of the custom logic 202 and the processor system 208.

At least a portion of the shared memory interface 204 may be automatically generated by the automatic processor integration module 124. The shared memory interface 204 includes a memory 210 (also referred to as a "first memory"), a memory 212 (also referred to as a "second memory"), and a memory map 214. The custom logic 202 is coupled to the memory 210. The custom logic 202 stores data to be sent to the processor system 208 in the memory 210, and reads data sent by the processor system 208 from the memory 210.

The memory 210 is associated with the memory 212. The memory 210 may be a first half or portion of the shared memory interface 204, and the memory 212 may be a second half or portion of the shared memory interface 204. Note that the portions of the memory need not be of equal size. The memory 212 is coupled to the memory map 214, which facilitates access by the processor system 208 to the memory 212. The memory map 214 includes a well-defined interface and is coupled to the bus adapter 206. The processor system 208 stores data to be sent to the custom logic 202 in the memory 212, and reads data sent by the custom logic 202 from the memory 212. When physically implemented, the memory 210 and the memory 212 may comprise separate physical memory circuits coupled to each other, or may be implemented using a single physical memory circuit. The single physical memory circuit may be a dual-port memory, where one port is coupled to the custom logic 202 and another port is coupled to the memory map 214. The memory 210 and the memory 212 may represent different types of memories, such as random access memories (RAMs), first-in-first-out (FIFO) memories, register memories, and the like known in the art.

The processor system 208 includes an instruction processor ("processor 218") and a bus 216. The processor 218 may represent a soft processor, such as the MICROBLAZE processor available from Xilinx, Inc. Alternatively, the processor 218 may represent a hard processor, such as a POWER PC processor available from IBM Corporation, an x86 processor from Intel Corporation, an ARM processor from ARM Limited, or the like known in the art. The processor 218 is coupled to the bus 216, such as a processor local bus (PLB) or like type bus known in the art. The processor system 208 may include one or more peripherals 250 coupled to the bus 216 and configured for communication with the processor 218. The bus adapter 206 is configured to provide an interface between the shared memory interface 204 and the bus 216 of the processor system 208. The bus adapter 206 may be automatically generated by the automatic processor integration module 124.

The clock wrapper 226 includes a clock input 220, and a clock input 222. The clock input 220 is configured to receive a clock signal, designated as SYS_CLK (also referred to as a "first clock"). The clock input 222 is configured to receive a clock signal, designated as PROC_CLK (also referred to as a "second clock"). The SYS_CLK clock signal may be asynchronous with respect to the PROC_CLK signal. The clock input 220 is coupled to clock ports of the custom logic 202 and the memory 210. The clock input 222 is coupled to a clock port of the processor system 208. The processor system 208 may distribute the PROC_CLK signal or a clock signal derived from the PROC_CLK signal among the processor 218, the peripherals 250, and the bus 216. The clock wrapper 226 also includes a clock source 224, which is configured to provide a clock signal designated as BUS_CLK (also referred to as a "third clock"). The clock source 224 is extracted from the bus 216, and is coupled to clock ports of the bus adapter 206, the memory map 214, and the shared memory 212. The clock wrapper 226 may be automatically generated by the automatic processor integration module 124.

Accordingly, the clock wrapper 226 provides a dual-clock interface to the circuit model 114. The custom logic 202 and the associated memory 210 are driven by the SYS_CLK clock signal. The processor system 208 is in turn driven by the PROC_CLK clock signal. The BUS_CLK clock signal is extracted from the bus 216 in the processor system 208 and is used to drive the bus adapter 206, the memory map 214, and the memory 212. The dual-clock scheme of the clock wrapper 226 allows for any processor system to be imported into the circuit model 114, regardless of the required clock frequency. That is, clocking of the processor system 208 is independent of the clocking of the custom logic 202. Thus, designers can import processor systems that require clock frequencies not supported by the hardware co-simulation system with respect to the clock signal SYS_CLK that drives the custom logic 202. The clock source that drives the bus 216 in the processor system 208 is extracted and used to drive the bus adapter 206, the memory map 214, and the memory 212. This ensures that the bus decoding can operate properly regardless of the frequencies of the PROC_CLK and SYS_CLK clock signals.

For purposes of clarity by example, the clock wrapper 226 has been described with respect to dual clocks for a processor system 208 and custom logic 202, respectively. It is to be understood that, in some embodiments, the dual-clock scheme described above can be employed in circuit models having multiple processor systems communicating with multiple custom logics. For example, a clock wrapper may be based on the clock wrapper 226, but may include multiple PROC_CLK inputs and multiple SYS_CLK inputs for the multiple processor systems and multiple custom logics, respectively.

Figure 3:
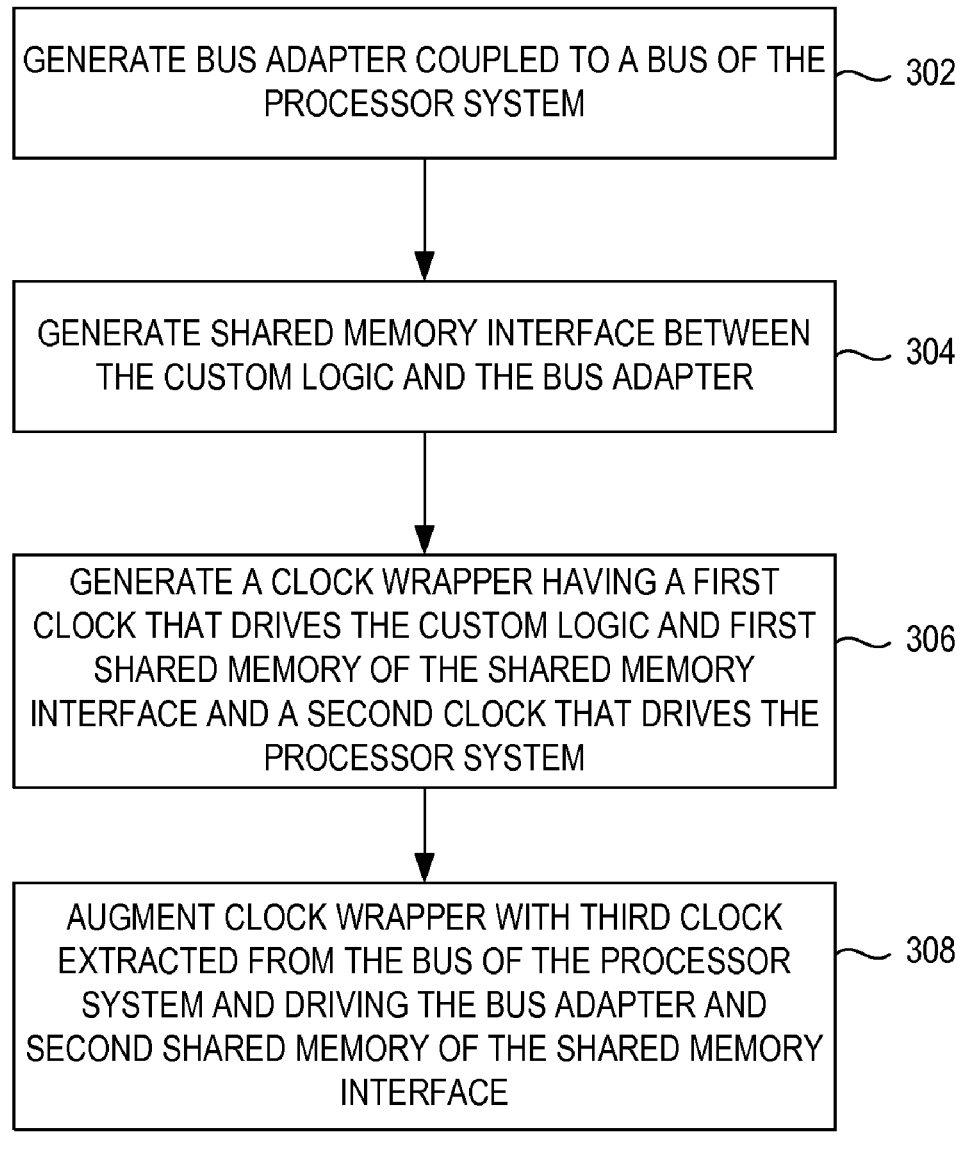
FIG. 3 is a flow diagram depicting a method of designing a circuit model having a processor system and custom logic according to some embodiments of the invention.

FIG. 3 is a flow diagram depicting a method 300 of designing a circuit model having a processor system and custom logic according to some embodiments of the invention. The method 300 may be implemented by the automatic processor integration module 124. In some embodiments, the automatic processor integration module 214 comprises software executed by the CPU 106, and thus the method 300 can be a computer-implemented method.

The method 300 begins at step 302, where a bus adapter coupled to a bus of the processor system is generated. At step 304, a shared memory interface between the custom logic and the bus adapter is generated. The shared memory interface may include a memory map of the processor system. At step 306, a clock wrapper having a first clock and a second clock is generated. The first clock drives the custom logic and first shared memory of the shared memory interface. The second clock drives the processor system. At step 308, the clock wrapper is augmented to include a third clock extracted from the bus. The third clock drives the bus adapter and second shared memory of the shared memory interface.

Figure 4:
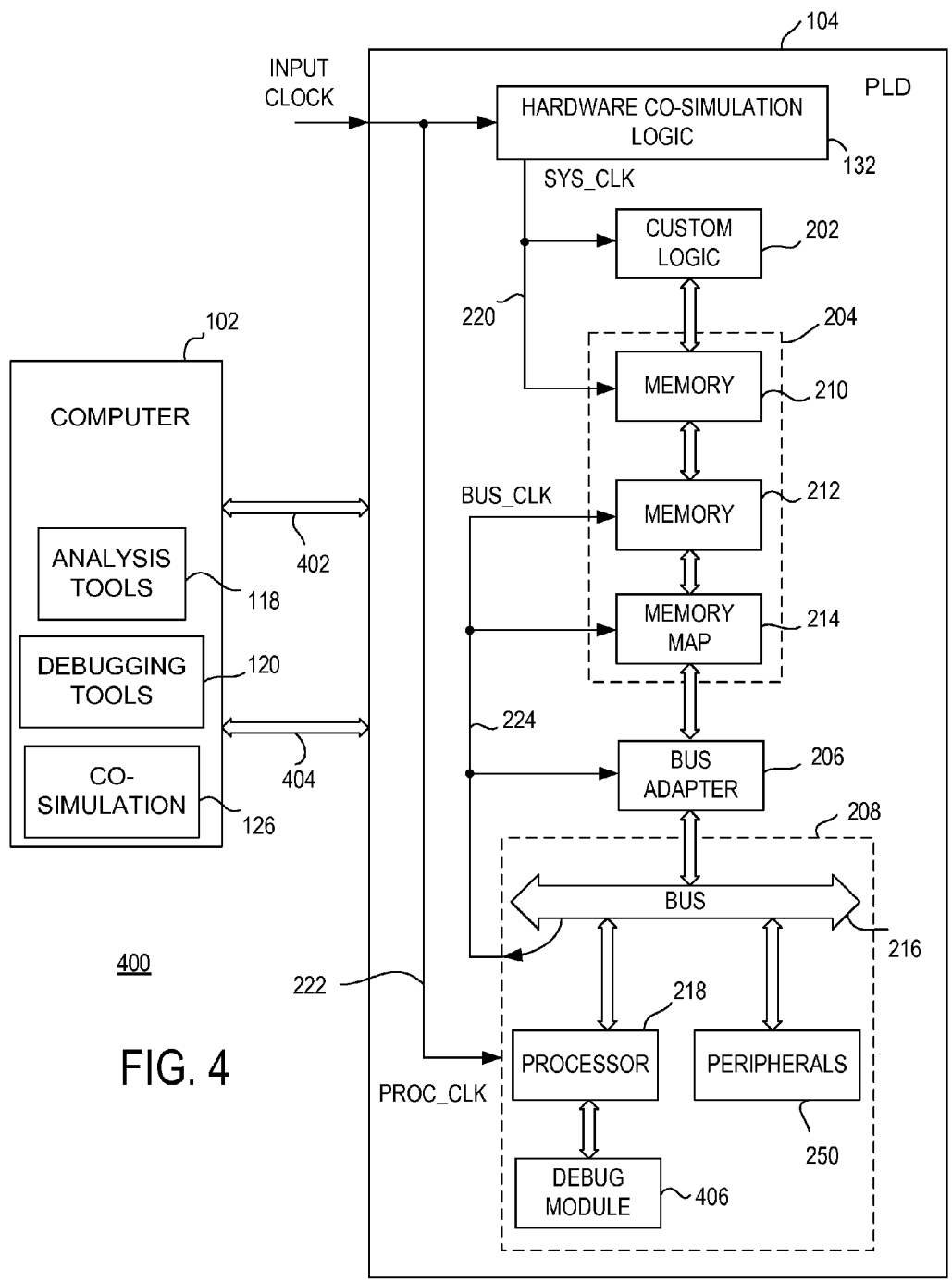
FIG. 4 is a block diagram depicting a portion of the EDA system of FIG. 1 according to some embodiments of the invention.

FIG. 4 is a block diagram depicting a portion 400 of the EDA system 100 according to some embodiments of the invention. Elements of FIG. 4 that are the same or similar to those of FIGS. 1 and 2 are designated with identical reference numerals. For clarity, some details of the EDA system 100 as shown in FIG. 1 are omitted. The circuit model implementation 130 implements the circuit model 114 as shown in FIG. 2. In some embodiments, the PLD 104 is configured to receive an input clock, which is coupled to the hardware co-simulation logic 132. The hardware co-simulation logic 132 is configured to generate the SYS_CLK clock signal based on the input clock. The PROC_CLK signal is derived from the input clock signal. In the present example, the PROC_CLK signal is equivalent to the input clock. It is to be understood that other elements may be between the input clock and the PROC_CLK, such as clock buffers, clock managers, and the like, which are omitted for clarity. Accordingly, the circuit model implementation 130 is configured to receive two independent clock signals (which may be asynchronous), one for the custom logic 202 and associated circuitry (e.g., the shared memory 210), and one for the processor system 208.

The computer 102 is coupled to the PLD 104 via an interface 402 and an interface 404. The computer 102 uses the interface 402 to drive the co-simulation process, such as controlling with the hardware co-simulation logic 132, communicating input/output data with the custom logic 202 and/or the processor system 208, and the like. For example, the interface 402 may comprise an Ethernet interface or like type interface known in the art. Notably, the co-simulation module 126 can control the hardware co-simulation logic 132 in either free-running clock mode or single step clock mode. In free-running clock mode, the hardware co-simulation logic 132 generates a free-running SYS_CLK signal. In single step clock mode, the hardware co-simulation logic 132 gates the SYS_CLK signal under control of the co-simulation module 126. In some embodiments, in both the free-running and single step clock modes, the processor system 208 continues to receive a free running clock (the PROC_CLK remains free running).

Accordingly, a dual-clock hardware co-simulation scheme is provided. The dual-clock scheme is more flexible than a single clock scheme and allows for hardware co-simulation in a broader array of design scenarios than can be handled by a single clock scheme. Users can drive an imported processor system with a desired clock frequency that is not specifically supported by the co-simulation system of an HLMS. Further, the dual-clock scheme allows peripherals in the processor system to operate at their required clock frequencies, which also may be unsupported by the co-simulation system or different from the custom logic. Further, users can employ clock management resources in the processor system, such as digital clock managers (DCMs), phase locked loops (PLLs), and the like, without the concern of cascading such elements with similar clock management resources in the hardware co-simulation logic.

In some embodiments, the processor system 208 may be configured with a debug module 406 coupled to the processor 218. The debug module 406 facilitates debugging of software being executed by the processor 218. The debugging tools 120 may communicate with the debug module 406 via the interface 404. For example, the interface 404 may be a Joint Test Action Group (JTAG) interface or the like. As noted above, in some embodiments, the hardware co-simulation logic 132 is configured in single step mode, while the PROC_CLK signal is free running. Thus, only the custom logic 202 and associated shared memory 210 are single-stepped based on a gated clock. The processor system 208, the bus adapter 206, the memory map 214, and the shared memory 212 continue to be driven by free-running clock signals. Accordingly, the debugging tools 120 can communicate with the debug module 406 through the interface 404 to perform software debugging. At the same time, the co-simulation module 126 can single step the custom logic 202 and examine the status of the custom logic 202 using the analysis tools 118 (e.g., using various scoping facilities).

Thus, the dual-clock hardware co-simulation scheme further allows for on-chip co-debugging. In a single-clock scheme, the whole circuit model is either single-stepped or free-run. The free-running mode allows debugging tools to work properly with the imported processor, but limits the debugging of the custom logic. Conversely, the single-step mode allows analysis tools to debug/analyze the custom logic, but disables the processor debugger. Unlike a single-clock scheme, the dual-clock scheme allows a user to free-run the imported processor system on hardware, while simultaneously single stepping the custom logic of the circuit model. For example, a user can use a software debugging tool to debug software programs running on the imported processor (e.g., via a JTAG interface), while simultaneously pausing/resuming simulation of the custom logic to examine the status thereof using various scoping facilities.

Figure 5:
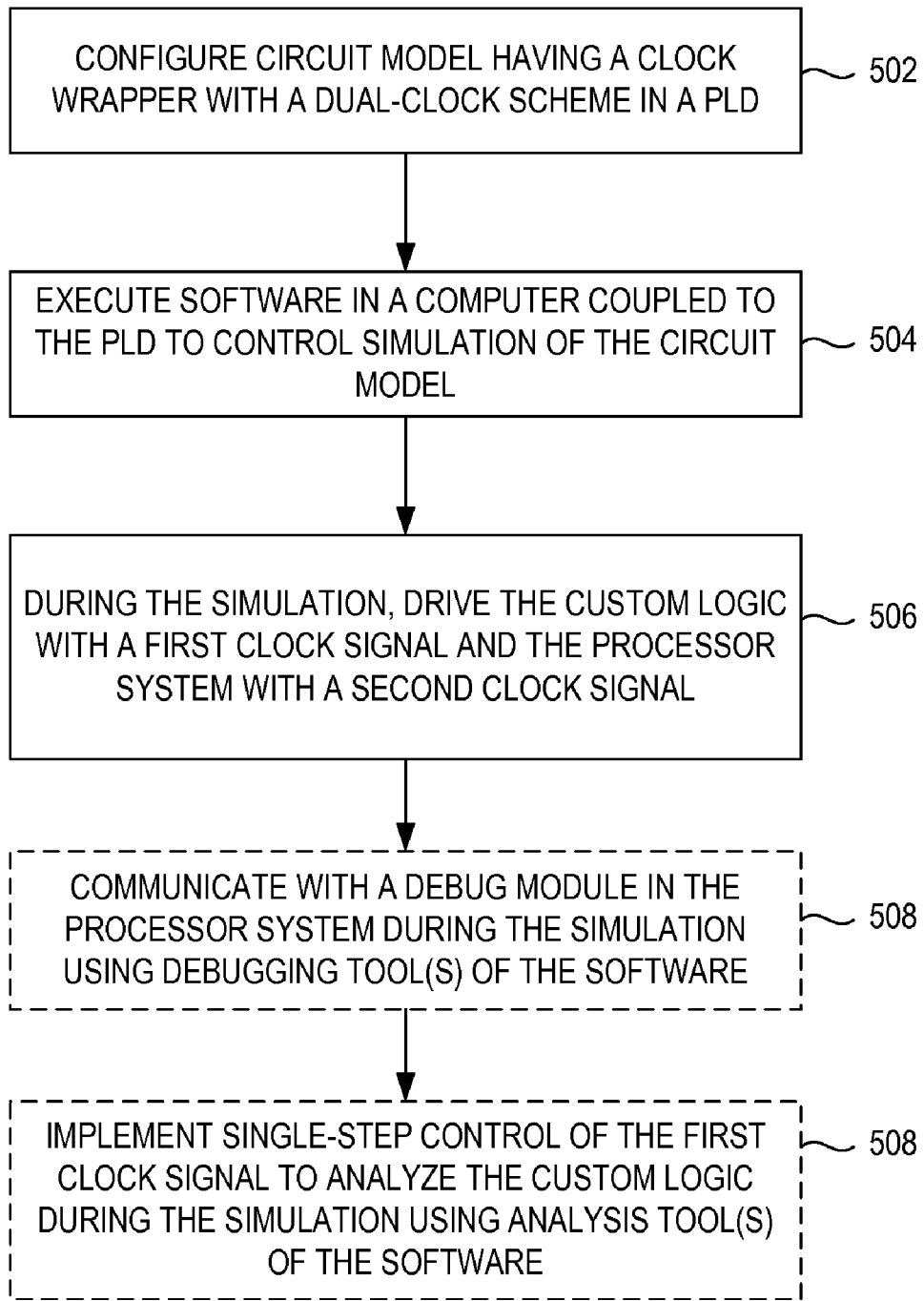
FIG. 5 is a flow diagram depicting a method of simulating a circuit model having a processor system and custom logic according to some embodiments of the invention.

FIG. 5 is a flow diagram depicting a method 500 of simulating a circuit model having a processor system and custom logic according to some embodiments of the invention. The method 500 may be performed using the EDA system 100 described above. The method 500 begins at step 502, where the circuit model having a dual-clock scheme is configured in a PLD or other programmable device or devices. As noted above, in some embodiments, the circuit model includes a clock wrapper having a first clock input and a second clock input, where the first clock input drives the custom logic and the second clock input drives the processor system. At step 504, software in a computer coupled to the PLD is executed to control simulation of the circuit model. At step 506, during the simulation, the custom logic is driven with a first clock signal and the processor system is driven with a second clock signal. At optional step 508, at least one debugging tool of the software communicates with a debug module in the processor system during the simulation. At optional step 510, the software implements single-step control of the first clock signal to analyze the custom logic using at least one analysis tool of the software during the simulation.

An aspect of the invention is implemented as a program product for use with a computer system. Program(s) of the program product define functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of designing a circuit model having a processor system and custom circuits, comprising:
   generating a bus adapter coupled to a bus of the processor system;
   generating a shared memory interface between the custom circuits and the bus adapter, the shared memory interface including a first shared memory and a memory map for the processor system; and
   on a computer, generating a clock wrapper having the processor system, custom circuits, a first clock input and a second clock input for simulation on a programmable device, the first clock input driving the custom circuits and the first shared memory of the shared memory interface with a first clock signal, and the second clock input driving the processor system with a second clock signal;
   wherein the first clock signal is controllable as a gated clock signal in response to a single step control signal by a co-simulation module executing on the computer, or the first clock signal is controllable as a free-running clock signal in response to a free-running control signal by the co-simulation module, and wherein the second clock signal is another free-running clock signal, and
   wherein the gated clock signal at the first clock input, in response to the single step control signal, single steps the custom circuits on the programmable device simultaneously while the second clock signal free runs the processor system on the programmable device.

2. The method of claim 1, wherein the shared memory interface further includes a second shared memory, and the clock wrapper further comprises a third clock input extracted from the bus and driving the bus adaptor and the second shared memory of the shared memory interface.

3. The method of claim 2, wherein the first shared memory comprises a first portion of the shared memory interface coupled to the custom circuits, and wherein the second shared memory comprises a second portion of the shared memory interface coupled to the bus adapter.

4. The method of claim 1, wherein the first clock input is configured to receive the first clock signal asynchronous with respect to the second clock signal coupled to the second clock input.

5. A method of simulating a circuit model having a processor system and custom circuits, comprising:
   configuring the circuit model in at least one programmable device, the circuit model including a clock wrapper having the processor system, custom circuits, a first clock input and a second clock input, the first clock input configured to drive the custom circuits and the second clock input configured to drive the processor system;
   executing software in a computer coupled to the at least one programmable device to control simulation of the circuit model; and
   coupling a first clock signal to the first clock input and a second clock signal to the second clock input during the simulation;
   wherein the first clock signal is a gated clock signal responsive to single step control by the software in the computer, or the first clock signal is free-running responsive to free-running control by the software in the computer, and wherein the second clock signal is a free-running clock signal, and
   wherein the gated clock signal at the first clock input, in response to the single step control signal, single steps the custom circuits simultaneously while the free-running clock signal at the second clock input free runs the processor system.

6. The method of claim 5, wherein the second clock signal is derived from an input clock signal, and wherein the method further comprises:
   configuring the at least one programmable device with hardware co-simulation logic, the hardware co-simulation logic generating the first clock signal in response to the input clock signal.

7. The method of claim 5, wherein the circuit model includes a bus adapter coupled to a bus of the processor system, and a shared memory interface between the custom circuits and the bus adapter, the shared memory interface including a first shared memory and a memory map for the processor system, and wherein the first clock signal further drives the first shared memory of the shared memory interface.

8. The method of claim 7, wherein the shared memory interface further includes a second shared memory, and the clock wrapper includes a third clock signal extracted from the bus, the third clock signal driving the bus adaptor and the second shared memory of the shared memory interface.

9. The method of claim 8, wherein the first shared memory comprises a first portion of the shared memory interface coupled to the custom circuits, and wherein the second shared memory comprises a second portion of the shared memory interface coupled to the bus adapter.

10. The method of claim 5, wherein the processor system includes a debug module, and wherein the method further comprises:
    communicating with the debug module during the simulation using at least one debugging tool of the software.

11. The method of claim 10, further comprising:
    implementing the single step control to analyze the custom circuits using at least one analysis tool of the software.

12. An apparatus for simulating a circuit model having a processor system and custom circuits, comprising:

at least one programmable device having the circuit model configured therein, the circuit model including the processor system, the custom circuits, and a clock wrapper having a first clock input and a second clock input, the first clock input configured to receive a first clock signal to drive the custom circuits and the second clock input configured to receive a second clock signal to drive the processor system; and a computer, coupled to the at least one programmable device, configured to execute software to simulate logic and control simulation of the circuit model in the at least one programmable device;

wherein the first clock signal is a gated clock signal responsive to single step control by the software in the computer, or the first clock signal is free-running responsive to free-running control by the software in the computer, and wherein the second clock signal is a free-running clock signal, and wherein the gated clock signal at the first clock input, in response to the single step control signal, single steps the custom circuits simultaneously while the free-running clock signal at the second clock input free runs the processor system.

13. The apparatus of claim 12, wherein the second clock signal is derived from an input clock signal, and wherein the apparatus further comprises:

hardware co-simulation logic configured in the at least one programmable device, the hardware co-simulation logic generating the first clock signal in response to the input clock signal.

14. The apparatus of claim 12, wherein the circuit model includes a bus adapter coupled to a bus of the processor system, and a shared memory interface between the first portion of the custom circuits and the bus adapter, the shared memory interface including a first shared memory and a memory map for the processor system, and wherein the first clock signal further drives the first shared memory of the shared memory interface.

15. The apparatus of claim 14, wherein the shared memory interface further includes a second shared memory, and the clock wrapper includes a third clock signal extracted from the bus, the third clock signal configured to drive the bus adaptor and the second shared memory of the shared memory interface.

16. The apparatus of claim 12, wherein the processor system includes a debug module, wherein the software is configured to communicate with the debug module during the simulation using at least one debugging tool, and wherein the software implements the single step control to analyze the custom circuits using at least one analysis tool of the software.

* * * * *